(12) United States Patent
Francke et al.

(10) Patent No.: US 7,785,267 B2
(45) Date of Patent: Aug. 31, 2010

(54) METHOD AND DEVICE FOR THE MANAGEMENT OF LACTATING ANIMALS

(75) Inventors: Heinz Francke, Oelde (DE); Christian Müller, Aurora, IL (US); Paul Bergstrom, Canton, OH (US)

(73) Assignee: GEA Farm Technologies GmbH, Bonen (DE)

( * ) Notice: Subject to any disclaimer, the term of this patent is extended or adjusted under 35 U.S.C. 154(b) by 0 days.

(21) Appl. No.: 11/479,079

(22) Filed: Jun. 30, 2006

(65) Prior Publication Data

US 2008/0009765 A1 Jan. 10, 2008

(30) Foreign Application Priority Data

Jul. 4, 2005 (DE) .................. 10 2005 031 425

(51) Int. Cl.
*A61B 10/00* (2006.01)
*A61B 5/103* (2006.01)
*A01K 29/00* (2006.01)
*G08B 23/00* (2006.01)

(52) U.S. Cl. ............ 600/551; 600/588; 119/174; 340/573.3

(58) Field of Classification Search ............ 600/551, 600/547, 588; 119/174; 340/573.1, 573.3
See application file for complete search history.

(56) References Cited

U.S. PATENT DOCUMENTS

| | | | |
|---|---|---|---|
| 3,406,474 A * | 10/1968 | Bates | ............ 40/110 |
| 3,570,448 A | 3/1971 | Gates | |
| 5,777,905 A * | 7/1998 | Dowdle et al. | ............ 708/142 |
| 6,364,844 B1 * | 4/2002 | Regas et al. | ............ 600/551 |
| 6,656,130 B2 * | 12/2003 | Takehara et al. | ............ 600/551 |
| 7,441,515 B2 * | 10/2008 | Renz et al. | ............ 119/174 |
| 2002/0111561 A1 * | 8/2002 | Kaga | ............ 600/551 |
| 2002/0116134 A1 * | 8/2002 | Harada | ............ 702/19 |
| 2005/0145187 A1 * | 7/2005 | Gray | ............ 119/174 |
| 2006/0191485 A1 | 8/2006 | Francke et al. | |

FOREIGN PATENT DOCUMENTS

| | | |
|---|---|---|
| DE | 28 37 207 B1 | 9/1979 |
| DE | 296 398 A5 | 10/1983 |
| DE | 10 2004 027 749 A1 | 12/2004 |
| EP | 0 657 098 A1 | 6/1995 |
| EP | 0 913 084 A1 | 5/1999 |
| EP | 0 982 647 A1 | 3/2000 |
| WO | WO 97/47187 | 12/1997 |

OTHER PUBLICATIONS

European Search Report dated Oct. 26, 2006, 3pgs.
German Search Report dated, Oct. 4, 2006, 4pgs.
English language Abstract of EP0982647, European Patent Office's esp@cenet.com database, (1p).

* cited by examiner

*Primary Examiner*—Max Hindenburg
*Assistant Examiner*—Helen Q Nguyen
(74) *Attorney, Agent, or Firm*—Smith Law Office

(57) ABSTRACT

Method and device for the management of lactating animals wherein the reproduction stage of an animal is correlated with the lactation stage of the animal. A state of the animal is determined by means of automatically obtained sensor data. The state of the animal is graphically illustrated.

17 Claims, 2 Drawing Sheets

METHOD AND DEVICE FOR THE MANAGEMENT OF LACTATING ANIMALS

FIELD AND BACKGROUND OF THE INVENTION

Figure 1:
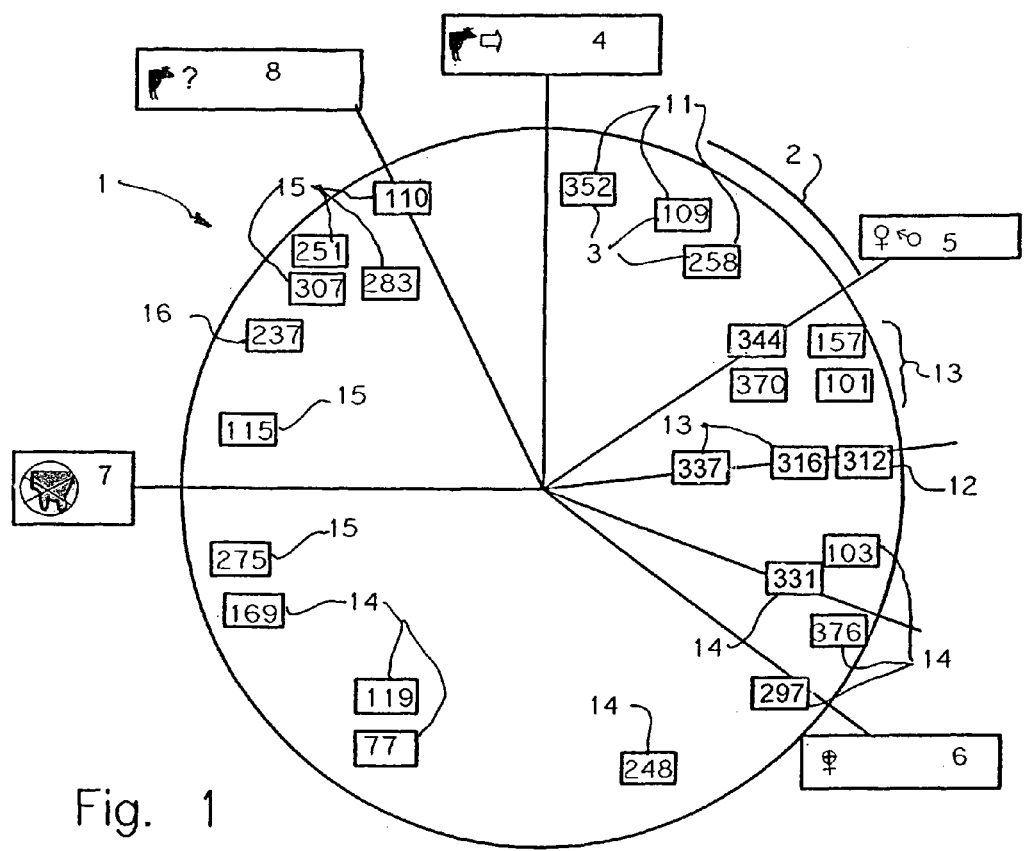

The present invention relates to a method and a device for the management of lactating animals such as cows, sheep, goats, buffaloes, llamas, camels, dromedaries, yaks, elks, horses and the like.

The invention may be employed in the management of conventionally milked animal herds. The invention may also be employed in the management of machine-milked or semi-automatically or automatically milked animals. Employment is also conceivable in herds where placement of the teat cups to the animal teats occurs for example semi-automatically or fully automatically or robot-assisted and/or computer-controlled.

Devices and methods for the management of lactating animals have become known in the prior art. There are for example manually operated systems for the management of animals where e.g. cube-shaped pegs representing an individual animal are pinned on a circular disk. Each peg is provided with a unique number for identifying the animal. Such an estrus disk illustrates the state of an animal throughout an entire year. Such manual estrus disks exist in different types, one of which will be explained in detail below.

One version of such an estrus disk may for example be provided with a mark on top for parturition. In this example the peg representing an animal that has just calved will be pinned into the top on the day of calving. The disk will then be rotated by 1° each day such that the disk will complete one full rotation in the course of one year.

A fixed, radial line for insemination is provided at a specific interval of days after calving. Animals reaching said line should be observed for indication of estrus and if estrus occurs, inseminated.

After insemination the respective peg is marked with an "inseminated" symbol and manually reset to the angular position of the insemination line even if the interval since the calving date is longer than the period corresponding to the angular distance between calving line and insemination line. From then on, time will be metered from the insemination date.

At a specific number of days after insemination, another radial line is provided. Inseminated animals passing said line should be tested for pregnancy. If the test shows an animal to be not pregnant, another insemination should be carried out and then the peg for the corresponding animal be reset on the insemination line.

Such estrus disk will provide the farmer with a quick overview of his entire herd. A disadvantage is that system maintenance and updates are very time demanding.

SUMMARY OF THE INVENTION

Therefore it is the object of the present invention to provide a simplified and possibly improved method and an improved device for the management in particular of lactating animals.

The method according to the invention for the management of animals and in particular of lactating animals correlates the reproduction stage of an animal with the lactation stage of the animal. At least one state of the animal is determined by means of automatically obtained sensor data. The state of the animal is illustrated in a graph.

The device according to the invention for the management of animals and in particular lactating animals comprises in particular at least one computing means and at least one display means. The computing means can include at least one automated controller and the display means can include at least one electronic display screen. At least one sensor means is provided for automatically obtaining sensor data. The reproduction stage of an animal is correlated with the lactation stage of the animal. At least one state of the animal is determined by means of automatically obtained sensor data wherein said automatically obtained data from the sensor means are taken into account for determining the at least one state of the animal. The state of the animal is furthermore illustrated on the display means in a graph.

In a specific embodiment of the invention the animal is graphically highlighted or the graphic illustration is highlighted if the sensor data of the animal is conspicuous and/or indicates changes in its state. This means that in the case of deviations from a standard the animal can be illustrated graphically highlighted. It is for example conceivable that animals are illustrated graphically highlighted if values increase or decrease by a preset amount or by a percentage value of e.g. +/−10%.

An advantageous embodiment provides that the current state of a plurality of animals is graphically illustrated on an electronic display screen. This provides for considerable advantages in terms of overview.

A specific embodiment provides that the animal is graphically highlighted if the animal is conspicuous. Visual observations of the farmer may be included and taken into account. A milker determining visibly evident changes may for example enter the data into the herd management system such that visual observations of the milker or the farmer are also taken into account.

Any visual, optical or other sensor-obtained data may likewise be taken into account for indicating that the state of the animal deviates from the usual course or for verifying a normal state.

The state of at least one animal is preferably illustrated over time. The state of the animal is in particular, at least for a time, plotted over the period since calving. The state of the animal is preferably, at least for a time, plotted in dependency on the reproduction state of the animal. With illustrating the state over the reproduction state, the estimated calving date of a pregnant animal will be readily apparent.

For not pregnant animals it is in particular readily recognizable which animals are yet to be inseminated and/or which animals must be tested for pregnancy and/or which animals may possibly have fertility problems. This will considerably facilitate herd management.

An advantageous embodiment provides for graphic output by means of an electronic display means. A suitable electronic display means is for example a graphic display, a monitor screen, a projector, a personal digital assistant (PDA), or a computer or a television monitor. The display output may be provided locally or remote. The individual components may be connected by wire or wireless. Connection may for example occur through a wireless local area network (WLAN) or Bluetooth or an infrared connection.

Preferably each animal is represented by a graphic symbol wherein each animal is preferably uniquely identifiable. For example each animal may be identified by a symbol allocated to a unique number.

Advantageous embodiments of the invention provide that at least one property of the symbol representing an animal depends on the physiological state of that animal.

At least one property of the symbol representing an animal may depend on the state of health and/or the metabolic condition (ketose) of the respective animal. Preferably at least one property of the symbol representing an animal may depend on the reproduction state and/or the lactation state of the animal.

An advantageous embodiment of the method of the invention and of the device of the invention provides that at least one property of the symbol representing an animal is selected from a group of properties comprising the appearance, the color, the brightness, the shape and/or the outer contour of the symbol.

In dependence on the reproduction state for example different colors may be assigned to the symbol representing an animal or the animal such that at least part of the symbol is colored in dependency on the reproduction state. Symbols of animals having just calved may for example be displayed in red while animals in estrus are represented in brown, and inseminated animals by a symbol at least part of which is blue. Animals whose pregnancy has been verified may for example be represented in green and dried-off animals may be plotted in at least partly violet symbols. Other color combinations are also conceivable.

Preferably the symbol of any one animal may periodically change for better visibility. This may occur for example through periodic switching on and off, or through flashing symbols. Highlighting may for example occur through alternating presentation in lighter or darker hues, through different colors, periodically changing sizes and/or shapes. This is preferably employed with conspicuous animals to further assist the user in terms of readability and overview.

Animals for whom estrus was automatically detected can thus be marked correspondingly on the electronic display screen such that a viewer will recognize them at a glance. The prior art has not allowed this. Although the computer-aided prior art methods provide for output of lists of animals having specific properties, the user must extract different data from separate lists.

With the invention, however, the user can view at a glance a plurality of animals and their current states. Highlighting specific animals will directly signal to the user the relevance of the highlight in the chronological context such that he can respond accordingly. For example a flashing indication of a cow which is long past the insemination line but has not yet been marked as inseminated may initiate the farmer to observe this animal more closely for indication of estrus. If the animal is for example provided with a pedometer for an activity sensor but does not indicate any estrus, the farmer can check the sensor for defects or the like. Or, the farmer checks the state of health of the animal.

Preferred specific embodiments of the invention use at least one type of sensor data taken from a group of sensor data comprising activity sensor data, milk quantity data, milk flow data, progesterone testing data, metabolism indicators, mastitis indicators, cell count data, conductivity data of extracted milk, measured inhibitor values in extracted milk, measured milk quality values, flake count in the milk, and the like. Furthermore, sensor data can be used which are captured by sensors characterizing the physiological state of an animal. It is also conceivable to use and include the data of rumination sensors, bolus with integrated temperature sensors, PH value sensors, and concentration sensors.

The sensor data are in particular evaluated and taken into account for determining the state of the animal.

Preferably a predefined insemination date is set. As a rule this will be a value between 30 and 60 days after calving. Earlier or later dates are also conceivable. From about the predefined insemination date the animals are more closely observed for indication of estrus. A useful aid are the automatically obtained sensor data which indicate an animal in estrus e.g. with a flashing symbol so as to be readily recognizable to the farmer.

For inseminated animals the time meter is preferably reset to the predefined insemination date such that the time axis will start again from then for the respective animal or the time will be metered anew from then.

Preferably a predefined date for pregnancy testing is set. Inseminated animals passing the predefined date for pregnancy testing will be given priority in pregnancy testing by the farmer. If pregnancy is not established, indication of the next estrus cycle is monitored and the animal inseminated again. The animal will then be reset in the time meter to the insemination date. For pregnant animals the time elapsed from the insemination date continues such that no changes in time metering occur.

In preferred embodiments the time is plotted over the angle. Preferably an angle of 360° designates the period of one year such that the entire lactation and reproduction period can be viewed directly.

A circular disk can for example be employed for presentation. In other embodiments the time is plotted linearly.

Preferred specific embodiments provide for the animals to be marked corresponding to their milk yield. In the case of circular plotting, animals having a high milk yield will preferably be plotted radially inwardly. Since the center of the disk provides less space, animals with the highest milk yields can readily be viewed while sufficient space is available also for animals with lower milk yields.

In Cartesian plots animals with higher milk yields may for example be entered near the top (or near the bottom).

Furthermore, animals with decreasing milk yield and/or animals with increasing milk yield may be represented by a specific symbol. With a milk yield decreasing over a specified period and also showing low absolute values and with the lactation stage advanced accordingly, the assessment signal may be output that this animal should be dried off.

A number of sensor means may be employed to perform an automatic plausibility check such that specific animals will only be specifically marked if the plausibility check results in a confirmation of the assessment.

Other embodiments provide automatic drawing of milk samples from problem animals to verify or reject the otherwise automatically obtained sensor data. A milk sample may serve to establish the milk quality by determining the contents. Progesterone testing is also conceivable.

Further features, characteristics and advantages of the present invention can be taken from the following description of the embodiments with reference to the attached drawings.

BRIEF DECRIPTION OF THE DRAWINGS

Figure 2:
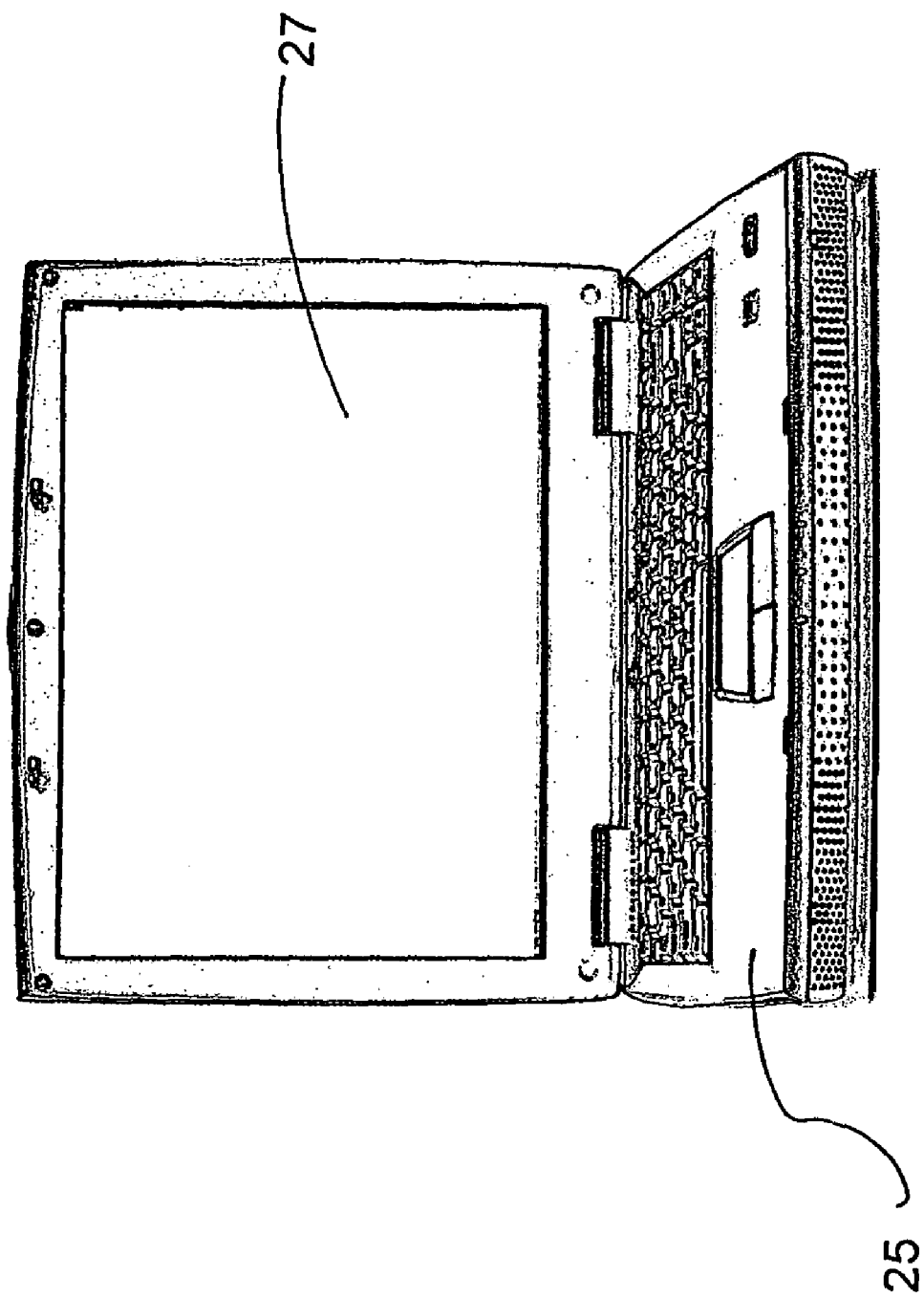

FIG. 1 the graphic output of a display of a management system according to the invention; and FIG. 2 depicts a computer and a display, in accordance with the present invention.

DETAILED DESCRIPTION OF THE PREFERRED EMBODIMENTS

Referring to the attached FIG. 1, an embodiment of the invention will now be described. FIG. 1 illustrates the graphic output 1. The individual animals 3 are represented by numbered squares wherein each number is a unique identification for an animal.

Plotting occurs in days over time 2 which is plotted clockwise herein. The date of calving 4 is specified by a vertical line 4. On the day of calving, the animals are placed on the line 4 through symbols. Thus the animal with the number 352 has calved only a few days ago while those with the numbers 109 and 258 have calved a few days prior to that.

Animals 3 reaching or approaching the radial line with the insemination date 5 will be observed for indication of estrus.

The symbols are illustrated with different numbers in relation to the state of the animals. Animals that have calved and not been inseminated yet are represented by symbol 11, while animals indicating estrus are plotted with symbol 12, inseminated animals with symbol 13, animals verified as pregnant with symbol 14, and dried-off animals e.g. with symbol 15. Animals to be singled out or to be slaughtered are represented with symbol 16.

The colored markings will provide the farmer with an immediate overview of conspicuous animals e.g. due to be inseminated or whose physiological state is not as desired in relation to the time elapsed since calving or insemination. The lactation state of the animal is correlated with the reproduction state wherein automatically obtained sensor data are taken into account and evaluated for plotting.

In the embodiment the symbol for animal No. 312 is highlighted by flashing because animal No. 312 has not been inseminated yet but indicates estrus. The indication of estrus is detected herein through an automatic activity sensor in the form of a step counter. Preferred embodiments provide for automatic progesterone testing to ensure detection of estrus.

These conditions have been fulfilled for animal No. 312 where the insemination due can be clearly indicated by flashing. After insemination, the symbol for animal No. 312 will be changed to symbol 13 and reset on the time scale to the angle at line 5.

When pregnancy is confirmed later, the symbol for animal No. 312 will be changed to symbol 14. Otherwise, if insemination has been unsuccessful, the animal must be inseminated again when estrus is observed. Then the symbol for the animal will again be reset to the insemination line 5.

As the date 6 for pregnancy testing is reached, the relevant animals are indicated on the electronic display screen and the farmer can perform the pregnancy tests. Specific embodiments provide for initiating tests automatically.

As an animal approaches the line 7 which indicates the date for drying-off and the milk yield of this animal decreases, the animal can be dried off. In this embodiment this has occurred e.g. with animal No. 275 although the line 7 has not been reached yet.

Line 8 indicates the anticipated calving date.

Conductivity measurements may also be taken into account. Other mastitis indicators and metabolism indicators may be employed to determine the state of the animal.

FIG. 2 illustrates a computer 25 and a display 27 that can be used in accordance with the present invention.

The invention claimed is:

1. A method for the management of a plurality of dairy animals by performing the following steps for each dairy animal, the method for each dairy animal comprising the steps of:
determining an initial state of the dairy animal wherein the initial state of the dairy animal corresponds to a reproduction and lactation cycle of the dairy animal;
graphically illustrating the initial state of the dairy animal with a graphic symbol on an electronic display screen by positioning the graphic symbol on a location of the electronic display screen corresponding to the dairy animal's initial state, wherein the electronic display screen displays a graphic representation of the reproduction and lactation cycle of the dairy animal;
automatically obtaining sensor data of a state of the dairy animal to determine whether there has been a change from its initial state; and
automatically changing the graphic symbol of the dairy animal using an automatic controller when the automatically obtained sensor data indicate a change from the dairy animal's initial state, and not changing the graphic symbol when the automatically obtained sensor data indicate no change from the dairy animal's initial state.

2. The method of claim 1 and further comprising the step of:
changing the graphic symbol of the dairy animal if the dairy animal's state is conspicuous.

3. The method according to claim 1, and further comprising the step of:
illustrating at least one dairy animal's state over time.

4. The method according to claim 1, wherein the step of graphically illustrating the state of the dairy animal with a graphic symbol includes the step of representing the dairy animal with a graphic symbol that depends on a current reproduction state of the dairy animal.

5. The method according to claim 1, wherein the step of graphically illustrating the state of the dairy animal with a graphic symbol includes the step of selecting the graphic symbol based on a physiological state of the dairy animal.

6. The method according to claim 1, wherein the step of graphically illustrating the state of the dairy animal with a graphic symbol includes the step of:
selecting the graphic symbol based on a metabolic state of the dairy animal.

7. The method according to claim 1, wherein the step of graphically illustrating the state of the dairy animal with a graphic symbol includes the step of:
selecting the graphic symbol based on the reproduction state of the dairy animal.

8. The method according to claim 1, wherein the step of graphically illustrating the state of the dairy animal with a graphic symbol includes the step of:
selecting the graphic symbol based on the lactation state of the dairy animal.

9. The method according to claim 1, wherein the step of graphically illustrating the state of the dairy animal with a graphic symbol includes the step of selecting the graphic symbol based on a group of symbol properties consisting essentially of:
appearance, color, brightness, shape and outer contour of the symbol, and combinations thereof 10. The method according to claim 1, wherein the step of graphically illustrating the state of the dairy animal with a graphic symbol includes the step of periodically changing the graphic symbol for better visibility.

11. The method according to claim 1, wherein the step of automatically obtaining sensor data comprises the step of obtaining sensor data from a group of sensor data consisting essentially of:
activity sensor data, milk quantity data, milk flow data, progesterone testing data, cell count data, mastitis indicators, metabolism indicators, conductivity data of extracted milk, measured inhibitor values in extracted milk, and data from other sensors which characterize the physiological state of a dairy animal, and combinations thereof.

12. The method according to claim 1, and further comprising the step of automatically setting an insemination date for the dairy animal using the automatic controller.

13. The method according to claim 1, and further comprising the steps of:
- determining whether the dairy animal has been inseminated; and
- graphically metering the dairy animal starting from an insemination date when it is determined that the dairy animal has been inseminated.

14. The method according to claim 1, and further comprising the step of automatically setting a date for pregnancy testing the dairy animal using the automatic controller.

15. The method according to claim 1, wherein the step of graphically illustrating the state of the dairy animal with a graphic symbol includes the step of:
- plotting on the electronic display screen, time over an angle on a graph.

16. The method according to claim 1, and further comprising the step of graphically plotting on the electronic display screen, the dairy animal's graphic symbol in relation to the dairy animal's milk yield.

17. A method for managing a plurality of lactating animals, the method for each lactating animal comprising the steps of:
- determining a first physiological state of the lactating animal;
- graphically representing the lactating animal with a corresponding symbol on an electronic display screen, wherein the symbol for the lactating animal and a position of the symbol on the electronic display screen corresponds to the lactating animal's first physiological state;
- positioning the symbol for the lactating animal on the electronic display screen relative to a calving date for the lactating animal;
- automatically obtaining data of a physiological state of the lactating animal;
- automatically changing the symbol for the lactating animal using an automatic controller when the automatically obtained data indicate a change in the first physiological state of the lactating animal and not changing the symbol when the automatically obtained data indicate no change in the first physiological state of the lactating animal; and
- maintaining the position of the symbol for the lactating animal on the electronic display screen after the symbol has been automatically changed.

* * * * *